Oct. 16, 1956 K. W. MAIER 2,766,931
MOTION ANALYZER

Filed Oct. 29, 1952 4 Sheets-Sheet 1

Fig-1-

INVENTOR.
Karl W. Maier
BY
W. E. Thibodeau + a. W. Dew
ATTORNEYS

Oct. 16, 1956

K. W. MAIER 2,766,931

MOTION ANALYZER

Filed Oct. 29, 1952

INVENTOR.
Karl W. Maier
BY
W. E. Thibodeau + A. W. Dew
ATTORNEYS

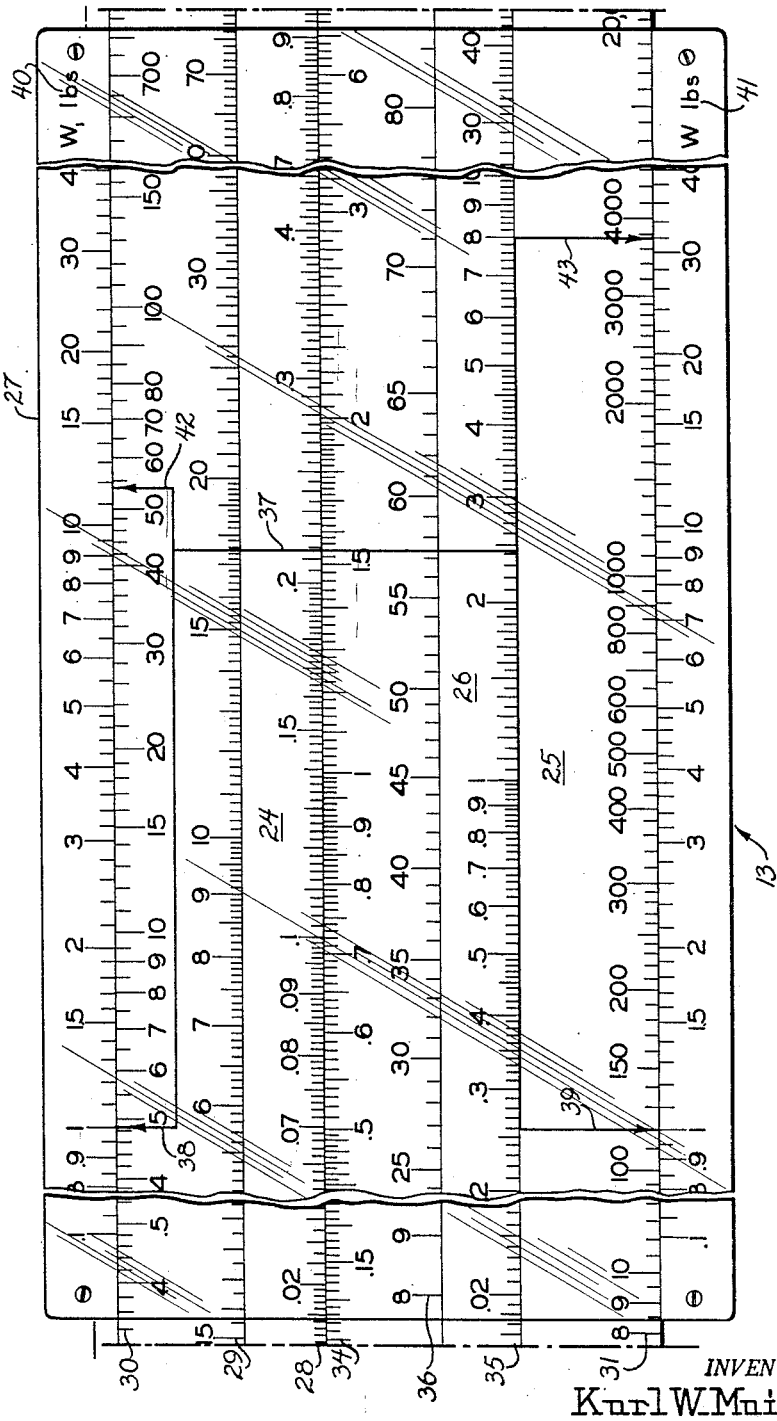

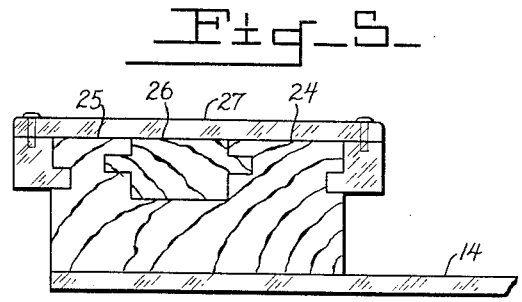
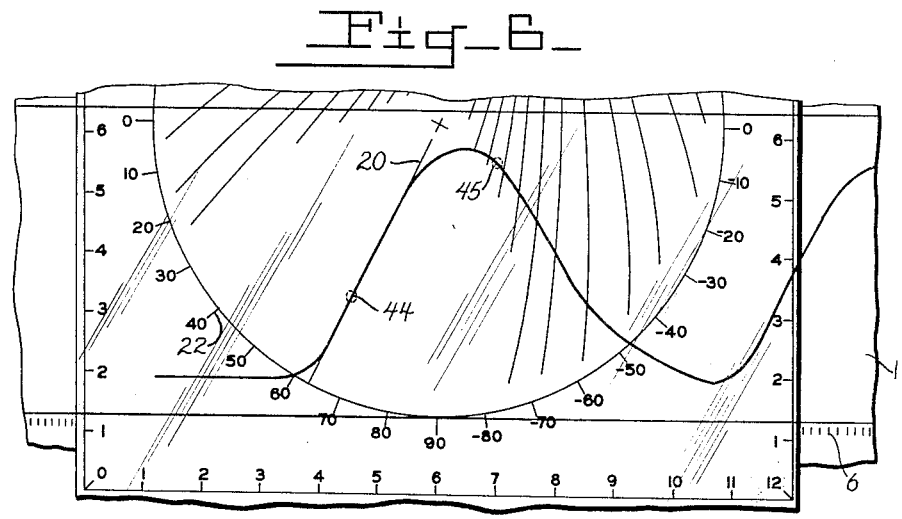
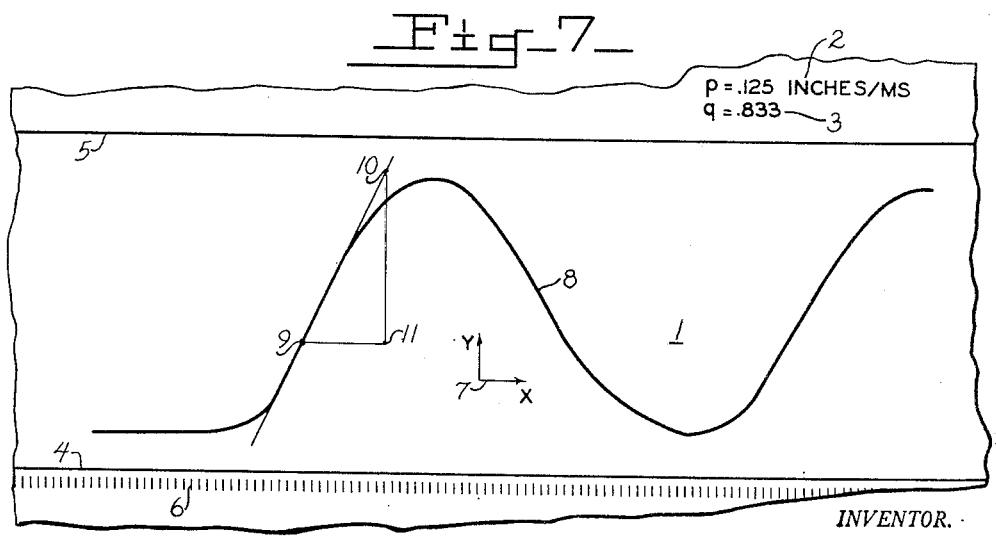

United States Patent Office 2,766,931
Patented Oct. 16, 1956

2,766,931

MOTION ANALYZER

Karl W. Maier, Springfield, Mass., assignor to the United States of America as represented by the Secretary of the Army Application October 29, 1952, Serial No. 317,606

3 Claims. (Cl. 235—61)

(Granted under Title 35, U. S. Code (1952), sec. 266)

The invention described herein may be manufactured and used by or for the Government for governmental purposes without the payment to me of any royalty thereon.

My invention relates to a device for evaluation of curves such as curves of the planar motion of an object and for determining parameters of the curves. Such analyses are made of the time-displacement curves of machine parts in the interest of design improvement to increase the efficiency of future models of the machines.

More particularly, my invention relates to a device of this character for evaluation of the time-displacement curves registered on high speed films of moving parts of an automatic gun as the gun is fired for application in determining such quantities as the velocity, kinetic energy, acceleration of the part or the accelerating force acting at a given point in its travel. For this purpose, a continuous record of the characteristics of the cycles of operation of the parts is desirable, but for most applications a determination of the characteristics at special points of the cycles is sufficient.

The velocity and the kinetic energy of a moving part are functions of the first derivative of the equation of motion of the part, while the acceleration and the force causing the motion are functions of the second derivative of the equation of motion. The first derivative of the motion equation or slope of the curve at a point on the curve is identical with the slope of the tangent at the point, while graphical determinations of the second derivatives of the curve require two-dimensional determinations.

Such a graphical analysis of a time-displacement film involves several drawing and computing steps to determine the characteristics of the moving part at each of the required points. Some of the drawing must be done on the film itself so that its value as a record is impaired and although the steps in themselves are simple enough, the multiplicity of them introduces high probability of error, requiring long and tedious effort of a trained technician to satisfactorily evaluate the curves.

Instead, the present invention consists of a single device having a section adapted for measuring a given time-displacement curve to determine the first and second derivatives of points on the curve and a cooperating section for computing the desired characteristics of the curve including a slide rule portion for compensating for the velocity and magnification of the film. Therefore, the film remains unmarked and the necessity for the drawings of the former method is eliminated.

The measuring section is formed of transparent material and includes a frame provided with a base line and a disc rotatable with respect to the frame. A family of confocal parabolic comparison curves together with the numerical second derivatives of the equations thereof and the common center line thereof are scribed on the disc. In the normal position of the disc, the center line of the curves is perpendicular to the base line. A scale scribed on the frame adjacent the disc indicates the degree of rotation of the center line from the base line for indicating the slope of the given curve at a given point when the center line is rotated into tangency with the curve at the given point. The graduations of a peripheral scale on the disc are formed of radius vectors of the parabolic curves and are designated according to the angles of slope of the curves at the point of intersection with the radius vectors. A pair of linear scales on the frame extending in directions parallel and perpendicular to the base line are graduated in inches.

The computing section of the device includes a fixed body member secured to the measuring device and a slider mounted in slidable relation to the fixed member. A transparent cursor having indicators scribed thereon is mounted in slidable relation to the fixed and slidable members. Scales are scribed on the body, the slider and the cursor extending in the direction of slide for computation of functions of the first and second derivatives of the equation of the curve.

An object of my invention is to provide an inexpensive device for determining the character of a given curve and for computing functions of derivatives of the equation of the curve.

Another object of my invention is to provide a unitary device for rapidly determining such functions.

A further object of my invention is to provide a device for determining such functions that is capable of being operated with a minimum of errors by a technician of ordinary skill.

An additional object of my invention is to provide a device for analyzing the time-displacement curve of a photographic print without damage to the print.

Other objects of my invention will appear from the following description of the invention and the novel features characteristic of the invention are set forth with particularity in the appended claims.

The invention itself, however, as to its organization and method of operation may best be understood by reference to the following description coupled with the accompanying drawing in which:

Figs. 2, 3 and 4 are elevation views of the computing section of my invention;

Fig. 5 is an enlarged partial end view of the device;

Fig. 6 is a partial view of the apparatus showing the center line of the comparison curves of the apparatus arranged in tangent relation with the curve of a time-displacement curve film (shown in phantom); and Fig. 7 is a view of the time-displacement film.

Figure 1:
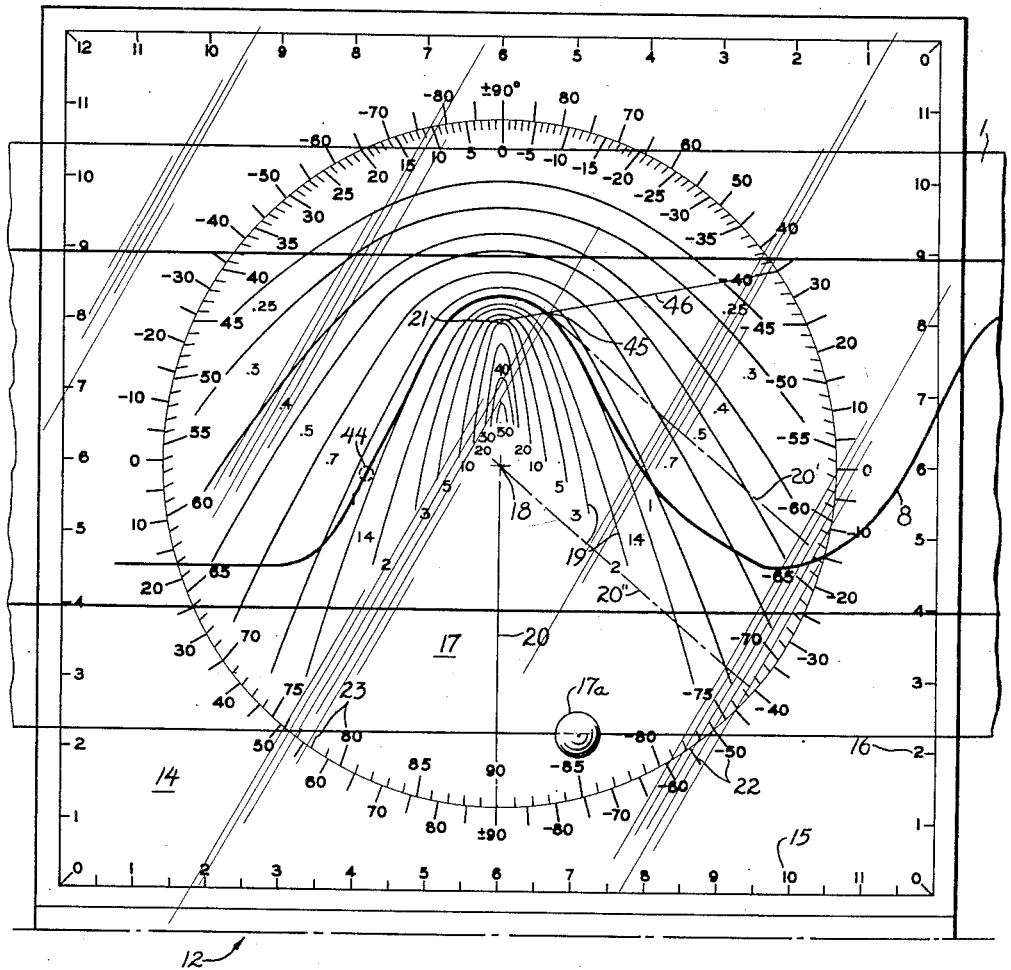
Fig. 1 is an elevation view of the measuring section of my invention in position for determining the second derivative of a film time-displacement curve.

Referring to the drawing, 1 of Fig. 6 is a TDC (time-displacement curve) film taken of a part during motion of the part parallel to the film, and having constants of record printed thereon including 2, the constant velocity $p$ of film movement in inches per millisecond and 3 the magnification of the film $q$. 4 and 5 are points on reference lines of the film and 4—5=$y_0$, film reference distance. Millisecond timing marks 6 on the film are spaced $p$ inches apart. Coordinate X—Y axes are indicated at 7. The film includes a typical time-displacement curve 8 of a moving part, having at point 9 a tangent 9—10 with components 9—11 and 10—11, respectively, in the X and Y directions.

Figure 2:
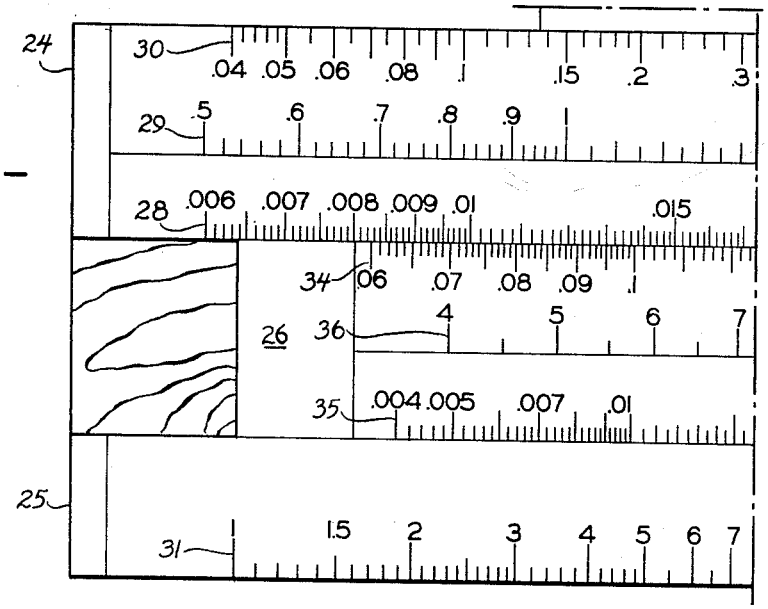
Figure 3:
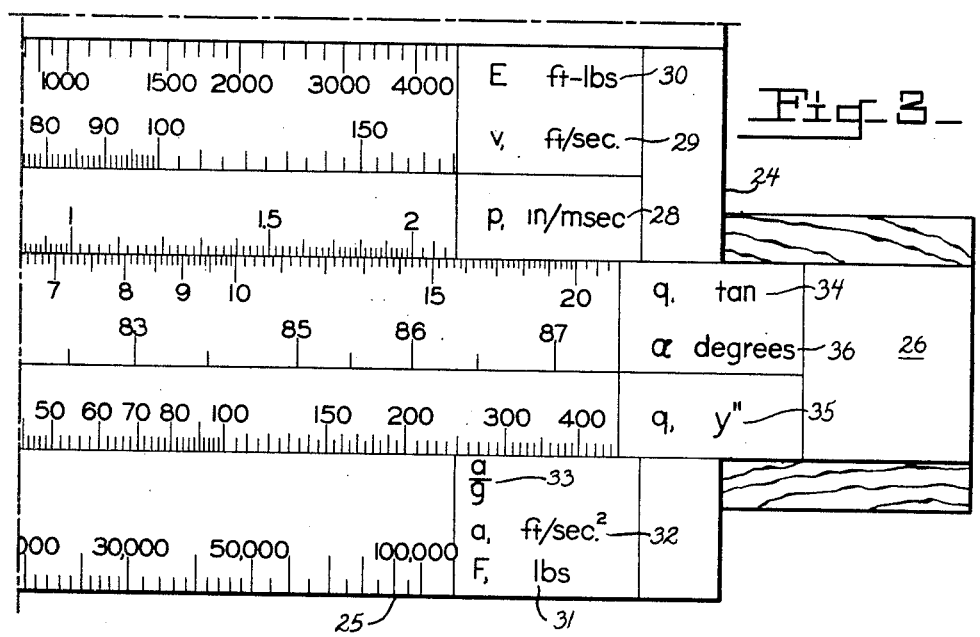

The analyzer shown in Figs. 1 and 2 includes a measuring section 12 of transparent material having a base line and a computing section 13. Section 12 includes a frame 14 having X-scale 15 and Y-scale 16 divided into inches and scribed thereon in directions respectively parallel and perpendicular to the base line.

A disc 17 is rotatable with respect to frame 14 about center 18 by means of knob 17a. A family of confocal parabolas 19 and the axis 20 thereof together with an indication of focus 21 of the curves are scribed on the disc with axis 20 in diametral relation therewith. The numerical second derivatives of the equations of the curves are scribed on the disc adjacent the curves corresponding thereto.

Rotation scale 22 divided into degrees and scale 23 are respectively scribed on frame 14 and disc 17 adjacent the division therebetween. Scale 22 indicates rotation of the axis from the base line and is graduated in quadrants to be positive for tangents ascending with time and negative for tangents descending with time. The divisions of scale 23 are formed by portions of radius vectors of the parabolic curves of the figures of the scale indicate the slope of the curve at the points of intersection by the radius vectors. The scale reads 0–90° in each direction from the vertex end of axis 20, negatively in the clockwise direction and positively in the counter-clockwise direction.

The first derivative or slope of a curve $y(x)$ at any point, $$y' = dy/dx = \tan \alpha$$

(where $\alpha$ is the angle of slope).

The velocity of the moving part, in feet per second, $$v = 1000\, p \cdot y'/12q$$
$$= 1000\, p \cdot \tan \alpha / 12q$$

The second derivative of $y(x)$, $$y'' = d^2y/dx^2$$

acceleration in feet per second per second, $$a = 10^6 \cdot p^2 \cdot y'' / 12q$$

acceleration in multiples of $g$, $$a/g = 10^6 \cdot p^2 \cdot y'' / 386q$$

Accelerating force, $$F = W \cdot a/g$$

Where W is the weight of the moving part, $$\therefore a/g = F/W$$

For a time-displacement curve of a film taken at constant speed $p$ and magnification, $q$, $$\Delta t \text{ (time interval)} = \Delta x / p$$

$$q = \Delta y / \Delta s$$

where $\Delta y$ equals displacement on the film and $\Delta s$ equals actual displacement $$\Delta s \text{ (actual displacement)} = \Delta y / q = s_0 \cdot \Delta y / y_0$$

Section 13 includes a body portion having parallel members 24 and 25 rigidly secured to frame 14, and provided with lateral longitudinal grooves. Slider 26 is provided with lateral longitudinal tongues adapted to fit in adjacent grooves of members 24 and 25 for slidable relation therebetween. Cursor 27 of transparent material is provided with a pair of tongues adapted to fit into the outer pair of the grooves of members 24 and 25 for movement in slidable relation to members 24 and 25 and slider 26. Logarithmic scales are scribed on the parts of section 13.

Member 24 scales include $p$-scale 28 graduated from .006 to 2.15 inches per millisecond for film speed, $v$-scale 29 graduated from 0.5 to 180 feet per second for velocity of the moving object, and E-scale 30 graduated from .04 to 4600 foot pounds for kinetic energy per pound of the moving object.

Member 25 is provided with scalar divisions of 1 to 100,000 applicable to F-scale 31 in pounds for the force on a pound of the moving object, $a$-scale 32 (acceleration scale) in feet per second per second and $a/g$ scale 33 for acceleration measured in gravity units.

The scales of members 24 and 25 are of unit physical length with $p$-scale 28 and $v$-scale 29 provided with common reference points in the direction of slide. The scalar divisions of E-scale 30 and the scalar divisions of member 25 are referred to a second reference point displaced from the common reference point in the direction of slide to allow a range of scale, higher than that required to correspond to the usual range of scales 28 and 29. The displacement is approximately proportionate to log 3 ($p$-scale) to allow a scale to be scribed on cursor 27 as described below.

Slider 26 scales include $(q, \tan \alpha)$-scale 34, graduated from .06 to 21.5, $(q,y'')$-scale 35, graduated from .004 to 460 and $\alpha$-scale 36 graduated from 4 to 87 degrees. The scales of slider 26 are of unit length and have the same reference point.

Cursor 27 is provided with index 37, upper indicator 38 and lower indicator 39 perpendicular to the direction of slide. Index 37 is adapted for indicating values on $p$-scale 28, $v$-scale 29 and the scales of slider 26. Indicator 38 is adapted for indication on E-scale 30 in indicator 39 is adapted for cooperation with F-scale 31 and $a/g$-scale 33. Indicators 38 and 39 are displaced from index 37 in the same direction and amount that the second reference point is displaced from the common reference point.

Cursor 27 is provided with a pair of identical W-scales (weight scales) including upper and lower scales 40 and 41 respectively, having unit graduations respectively coincident with indicators 38 and 39. Upper auxiliary indicator 42 of cursor 27 is displaced from indicator 38 a distance proportionate to the logarithm of 12 in the direction of increase of W-scale 40 and is adapted for reading inch-pound values on E-scale 30.

A-indicator 43 is displaced a distance proportionate to log $g$ (32.2) from indicator 39 in the direction of increase of the scalar divisions of member 25 to provide for direct indications of $a$-scale 32 on the scalar divisions of member 25.

In the normally closed position of the rule, index 37 is adapted simultaneously to indicate the unit reading on $p$-scale 28, 83.3 on $v$-scale 29 and 100 on $(q,y'')$-scale 35. At the same time, indicator 38 coincides with $(83.3)^2/64.1$ on E-scale 30 and indicator 39 coincides with 2600 on F-scale 31. Unit $(q, \tan \alpha)$-scale 34 and $(q,y'')$-scale 35 readings are simultaneous with the 45° indication on $\alpha$-scale 36. This position represents a film velocity of .1 inch per millisecond with unit magnification.

Evaluation of velocity

With the base line of the analyzer in parallel relation with the $x$-axis of coordinates 7, the analyzer is maneuvered to place axis 20 in tangent relation to curve 8 at a point 44. Angle $\alpha$ of point 44 is the reading on rotation scale 22 indicated by the outer end of axis 20.

Slider 26 is positioned with respect to body member 24 by aligning the values of $p$ and $q$ previously determined for film 1 respectively on $p$-scale 28 and $(q, \tan \alpha)$-scale 34.

Velocity in feet per second and in inches per millisecond of the moving part at points 44 are respectively indicated by index 37 on $v$-scale 29 and $p$-scale 28 when index 37 is positioned at the value of $\alpha$ on scale 36 obtained from rotation scale 22.

The kinetic energy of the moving part in foot pounds per pound at point 44 is indicated on E-scale 30 by indicator 38 as index 37 is maintained in the same position. The total kinetic energy of the moving part is indicated on E-scale 30 opposite the W-scale 40 reading corresponding to the weight of the moving part. Kinetic energy in inch pounds per pound at point 44 is indicated on E-scale 30 by auxiliary indicator 42.

Evaluation of acceleration

To determine the acceleration of the moving part at any point 45, the slope at point 45 is determined by means of axis 20 as explained for point 44 above. In Fig. 1 the tangency of axis 20 at point 45 is indicated by a line 20' and the position of line 20' with respect to frame 14 during the tangency at point 45 is shown by a dotted line 20''. As indicated by the outer end of line 20'', the slope of the curve at point 45 is minus 40. The radius vector 46 on disc 17 between focus 21 and the minus 40 division of scale 23 is drawn with a soft pencil. This line is the radius vector that intersects all of the comparison curves at points thereon having tangent angles minus 40, equal to the tangent of point 45.

To determine the second derivative at a point in a given curve, axis 20 is aligned with 90—90 graduations of frame 14 with the zero of scale 23 disposed at the top and bottom, respectively, for downward and upward sloping curves. The analyzer is moved with the base thereof in parallel relation to the X-axis of coordinates 7 for comparison with a corresponding portion of one of the parabolic curves with the pencil line 46 passing through point 45. The second derivative $y''$ of curve 8 at point 45 and of the matching comparison curve thus is shown in Fig. 1 to be 1.4.

Acceleration is respectively indicated in feet per second per second on $a$-scale 32 by indicator 43 and in multiples of $g$ on $(a/q)$-scale 33 by $(a/g)$-indicator 39 and the accelerating force in pounds per pound is indicated on F-scale 31 by indicator 39 when index 37 is positioned at the point on $(q,y'')$-scale 35 corresponding to the second derivative of the matching comparison curve. The total accelerating force on the moving part in pounds is indicated on F-scale 31 opposite the W-scale 41 indication of the weight of the part.

*Evaluation of time*

The time $\Delta t$ elapsed in the travel of the moving part between points 44 and 45 of curve 8, may be determined with $p$-scale 28 as an $x$-scale graduated in inches. The slider is set in the position of $p/(q, \tan \alpha) = .125/1$ ($p$-scale 28 reading .125 coincident with $(q, \tan \alpha)$-scale 34 reading 1) for determination of time between points 44 and 45 on the curve and $(q, \tan \alpha)$-scale 34 becomes a $t$-scale (time-scale), graduated in milliseconds.

$\Delta x$ the horizontal distance between points 44 and 45 is measured on $x$-scale 15 and $\Delta t$ equals the value indicated on $(q, \tan \alpha)$-scale 34 corresponding to the value of $\Delta x$ on $p$-scale 28. When the value of $\Delta x$ measured by scale 15 is greater than the range of $p$-scale 28, $\Delta t$ corresponding to $\Delta x/10$ is determined and the $(q, \tan \alpha)$-scale 34 indication is multiplied by 10 to produce $\Delta t$.

*Evaluation of displacement*

The displacement $\Delta s$ between points 44 and 45 may be determined with $(q, \tan \alpha)$-scale 34 as a $y$-scale in inches. The slider is set in the position $p/(q, \tan \alpha) = 1/q$ ($p$-scale 28 reading 1 coincident with $(q, \tan \alpha)$-scale 34 reading $q$) for determinations of displacement between points 44 and 45 on the curve and $p$-scale 28 becomes an $s$-scale graduated in inches.

$\Delta y$, the vertical distance between points 44 and 45 is measured on $y$-scale 16 and $\Delta s$ equals the value indicated on $p$-scale 28.

As indicated in the foregoing description, the device called for in my specification is inexpensive and is capable of rapid solution with a high degree of accuracy. In addition, the simplicity of the device allows it to be operated by a person of merely ordinary skilled without damage to films of record.

While a specific embodiment of my invention has been shown and described for purposes of illustration, it is to be understood that variations may be made therein and that the invention is to be limited only in accordance with the scope of the following claims.

I claim:

1. An analog device of transparent material comprising a frame with X—Y axes and a disc therein, said frame having scribed thereon scales corresponding to said axes for determination of displacement between particular points on a given curve, and a circular scale concentric with said disc having quadrants respectively graduated positively and negatively in degrees from said X-axis, said disc having scribed thereon a family of confocal parabolic curves together with respective designations of the second derivatives of the equations thereof and a peripheral scale having graduations formed by the radius vectors of said parabolic curves together with designations of the angles of slope of said parabolic curves at the intersections thereof with said radius vectors, and the common axis of said parabolic curves, said disc being rotatable for indicating on said circular scale the tangent angles at particular points in a given curve and for matching the curvatures of the given curve portion adjacent the particular points of corresponding portions of said parabolic curves including points having equal tangent angles to determine the second derivatives of the given curve at the particular points.

2. A transparent device for analyzing a measured curve on a record comprising a frame with X—Y axes scribed thereon for juxtaposition on the record with said axes in parallel relation with the corresponding axes of the measured curve and a disc in said frame having scribed thereon a family of confocal parabolic curves, radius vectors of said curves, and the axis of said curves in diametral relation with said disc, said frame including an inscribed circular scale in concentric relation with said disc including positive and negative quadrants graduated in degrees from said X-axis, said disc being rotatable in said frame for cooperation of said parabolic axis with said inscribed scale to determine the slope at a particular point in a given curve and for comparison of the portion of the given curve adjacent the particular point with a corresponding portion of one of said parabolic curves to determine the second derivative of the equation of the adjacent portion.

3. A transparent device for analyzing a time-displacement curve on a record comprising a frame with X—Y axes and corresponding linear scales scribed thereon for juxtaposition on the record with said axes in parallel relation with the corresponding axes of the time-displacement curve and a disc disposed in said frame having scribed thereon a family of confocal curves, radius vectors thereof, and the axis of the confocal curves in diametral relation with said disc, said frame including an inscribed circular scale in concentric relation with said disc including positive and negative quadrants graduated in degrees from said X-axis, said frame including scales parallel with said X—Y axes for determination of displacement between a pair of particular points on the time-displacement curve, said disc being rotatable for cooperation with said quadrant scale to determine the slope angle at one of the particular points, and to compare the portion of said given curve adjacent the one particular point with a corresponding portion of one of the parabolic curves adjacent a point of equal slope with said parabolic axis normal to said X-axis to determine the second derivative of the equation of the given curve portion.

References Cited in the file of this patent

UNITED STATES PATENTS

| | | |
|---|---|---|
| 1,088,175 | Phillips | Feb. 24, 1914 |
| 1,168,059 | Cuntz | Jan. 11, 1916 |
| 1,528,944 | Newell | Mar. 10, 1925 |
| 1,648,733 | Karapetoff | Nov. 8, 1927 |
| 1,930,478 | Jones | Oct. 17, 1933 |

OTHER REFERENCES

Abstract 559, 280 published February 28, 1950, on page 1204 of the February 28, 1950, Official Gazette.